United States Patent Office 2,763,288
Patented Sept. 18, 1956

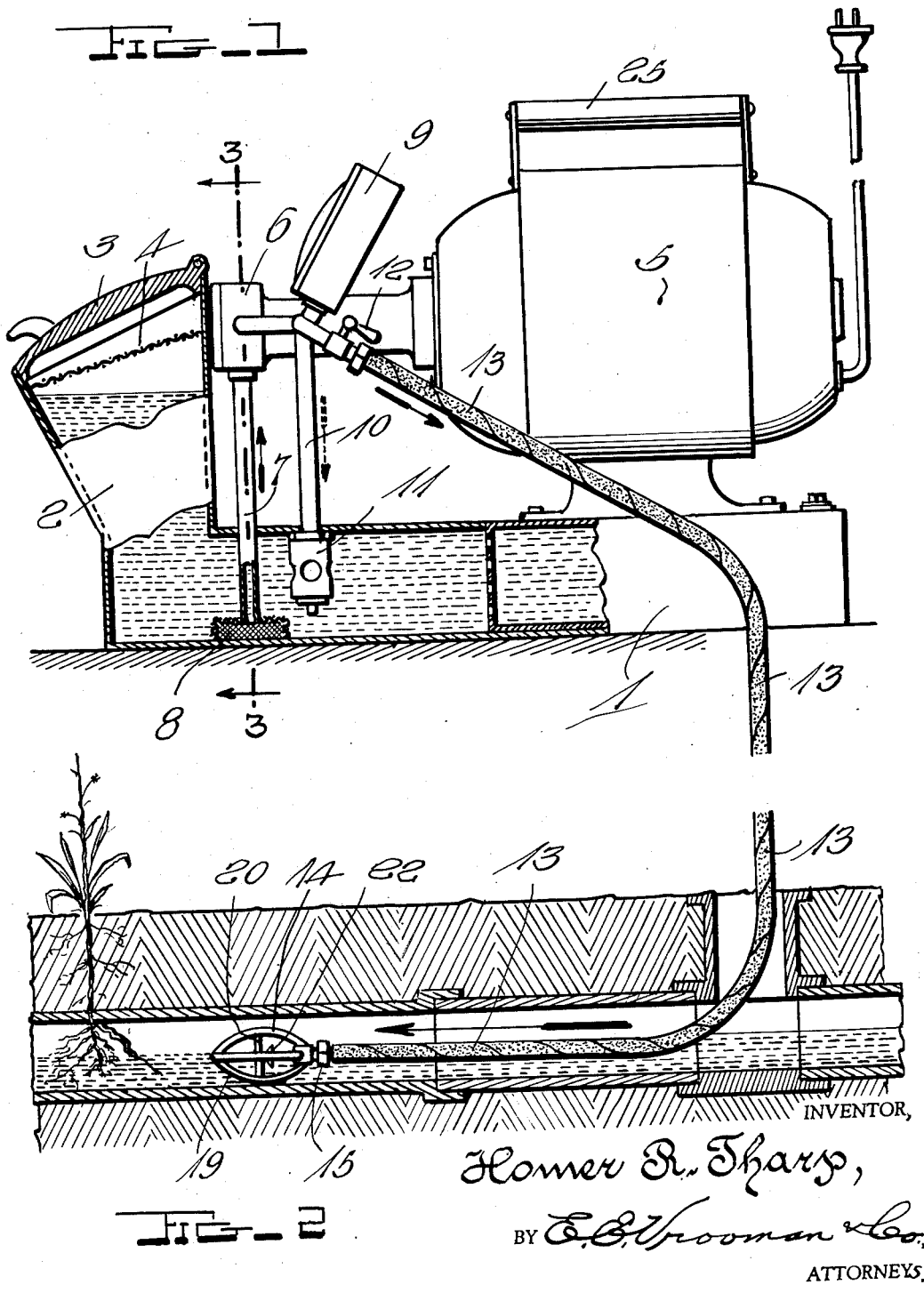

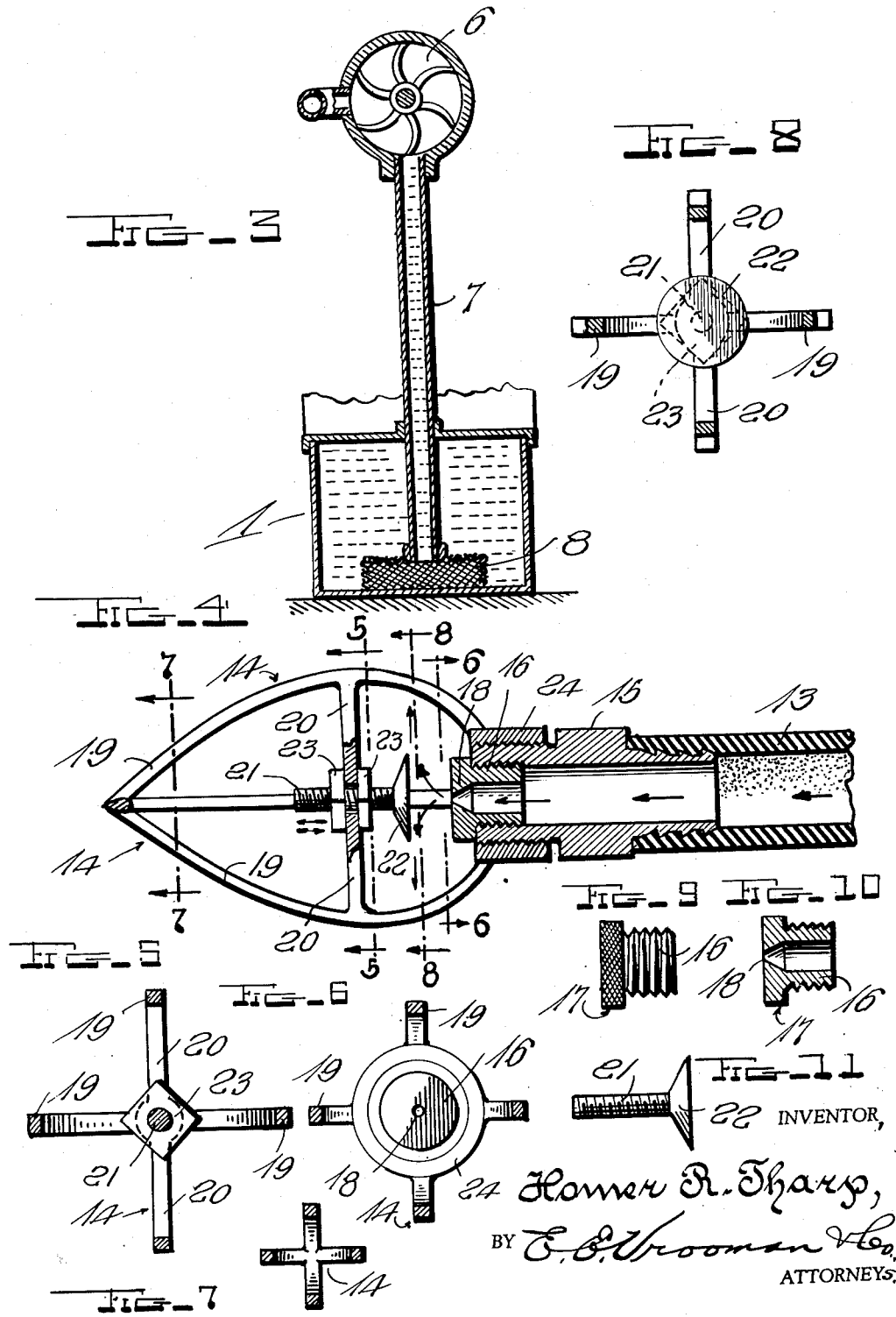

2,763,288

APPARATUS FOR KILLING AND REMOVING ROOTS FROM SUBMARINE PIPES

Homer R. Tharp, San Antonio, Tex.

Application August 4, 1955, Serial No. 526,434

1 Claim. (Cl. 137—565)

This invention relates to a method and apparatus for killing and removing roots from submarine pipes.

An object of this invention is to provide a portable apparatus which can be easily moved to the place of operation.

Another object of this invention is to provide an apparatus that has a minimum number of parts, and which is highly efficient in operation.

A still further object is to provide an apparatus of this character with a novel and an efficient nozzle device.

With the foregoing and other objects in view, my invention comprises certain novel constructions, combinations, and arrangements of parts as will be hereinafter fully described, illustrated in the accompanying drawings, and more particularly pointed out in the appended claim.

In the drawings:

Figure 1 is a view partly in side elevation and partly in longitudinal section of an apparatus constructed in accordance with this invention, while Figure 2 is a longitudinal section of a submarine pipe showing therein, in side elevation, the nozzle end of the apparatus.

Figure 3 is a vertical section taken on line 3—3, Figure 1, and looking in the direction of the arrows.

Figure 4 is an enlarged fragmentary sectional view of the apparatus showing the nozzle device.

Figure 5 is a sectional view taken on line 5—5, Figure 4, and looking in the direction of the arrows.

Figure 6 is a sectional view taken on line 6—6, Fig. 4, and looking in the direction of the arrows.

Figure 7 is a sectional view taken on line 7—7, Fig. 4, and looking in the direction of the arrows.

Figure 8 is a sectional view taken on line 8—8, Fig. 4, and looking in the direction of the arrows.

Figure 9 is a view in side elevation of the orifice, while

Figure 10 is a longitudinal section of the same.

Figure 11 is a view in side elevation of the splatter device.

Referring to the drawings by numerals, 1 designates an elongated, flat liquid chemical tank. This tank is provided at one end with a hopper-like spout 2; this spout 2 has a hinged lid 3, Fig. 1. Within the spout 2 and contiguous to the lid 3 is a screen 4 which divides the spout into an upper and a lower compartment, as shown. Suitably secured to the top of tank 1 is a motor 5, which may be a gas or electric motor. Fastened to the inner face of motor 5 is a gear pump 6, shown in section in Fig. 3. Extending downwardly from the pump 6 is a tube 7 that extends into the tank 1. On the inner end of said tube 7 is a sediment trap 8; this trap 8 preferably rests upon the bottom portion of tank 1, as shown. Chemical is placed in spout 2 and passes through screen 4 into the interior of tank 1. The chemical is in liquid form and passes through sediment trap 8, thence through tube 7 to the gear pump 6. From the gear pump 6 the liquid passes under pressure to the gage 9. From the gage 9 the liquid then passes through tube 10 into relief valve 11 back into tank 1 when the cut-off valve 12 is in a closed position. When the cut-off valve 12 is in an open position, the liquid chemical then passes through the hose 13. This hose 13 is spring wire wrapped.

On the outer end of hose 13 I place my nozzle device 14. Referring to Figure 4 the nozzle device 14 comprises an internally and externally threaded sleeve 15. An externally threaded orifice 16 extends into the outer end of sleeve 15. This orifice has an enlarged grip surface 17, Figs. 9 and 10, with a small discharge opening 18. The nozzle device 14 includes an open frame 19. This frame has a transverse brace 20. Extending through said brace 20, Fig. 4, is an externally threaded stem 21 on one end of which is a splatter disc 22. In an assembled position as shown, the liquid chemical is forced under pressure through discharge opening 18 against disc 22 resulting in the liquid spreading perpendicular to its former direction of travel, and in a radius of 360 degrees out of the nozzle frame to the sewer walls.

On the stem 21 are tightening nuts 23 which are located against the sides of the brace 20 when the device is in its operating position. The open frame of the nozzle device is integral with an internally threaded sleeve 24, which is threaded on the external threads of sleeve 15, Fig. 4.

A handle 25, Fig. 1, is attached to the motor 5 whereby the operator can easily transport the entire apparatus from one position to another.

This apparatus is primarily for use in spraying the inner walls of any size sewer pipe, and by means of the liquid being forced under pressure to discharge through the nozzle device, the spraying liquid will reach a great distance. The hose 13 is steel wire wrapped to give it stability when being shoved in a sewer from the point of entrance without doubling back, yet flexible enough to make curves and carry deadly chemical to the roots of the vegetation that has penetrated the walls of the sewer, as is usual when sewers become cracked or otherwise deficient. The roots of the plant or tree will rot off through the process of turning pithy or softening and will drop off small amounts at a time, which rotted roots will be carried away by the surge of water through the pipe or pipes.

By reason of the adjustability of the stem 21 upon brace 20, the splatter disc 22 can be adjusted to a nicety.

In Figure 2 there is shown a plant or small tree that is growing with its roots extending into the sewer. The chemical can be sprayed directly on said roots which will eventually cause them to decay and then the roots can be removed by flushing the sewer.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such alterations or changes as shall fairly fall within the scope of the appended claim.

What I claim is:

In an apparatus of the class described, the combination of a flat elongated tank provided at one end with an upwardly extending spout having an open upper end, a hinged lid on said end closing the same, said spout provided with a screen therein contiguous to said lid, said screen dividing said spout into an upper and a lower compartment, a motor and means mounting said motor on said tank, a gear pump fastened to the inner face of said motor, a sediment trap in said tank, a tube connected to said sediment trap and to said pump, said sediment trap resting upon the bottom of said tank, a tube extending from said pump, a tube provided with a relief valve on its lower end being connected at its upper end to a hose-supporting pipe, and said last-mentioned pipe provided with a manually operated valve.

References Cited in the file of this patent

UNITED STATES PATENTS

| | | |
|---|---|---|
| 1,506,652 | Maker | Aug. 26, 1924 |
| 2,011,196 | Moody | Aug. 13, 1935 |
| 2,038,778 | Williams | Apr. 28, 1936 |
| 2,231,229 | Spreng | Feb. 11, 1941 |
| 2,311,197 | Ahern | Feb. 16, 1943 |
| 2,413,710 | Jason | Jan. 7, 1947 |
| 2,462,034 | Zeck | Feb. 15, 1949 |
| 2,530,002 | Coy | Nov. 14, 1950 |
| 2,584,661 | Barker | Feb. 5, 1952 |
| 2,651,545 | Shotton | Sept. 8, 1953 |
| 2,694,022 | Schreiner | Nov. 9, 1954 |